United States Patent
Nagaoka et al.

(10) Patent No.: US 8,356,470 B2
(45) Date of Patent: Jan. 22, 2013

(54) METHOD OF CONTROLLING NOX PURIFICATION SYSTEM AND NOX PURIFICATION SYSTEM

(75) Inventors: Daiji Nagaoka, Fujisawa (JP); Masashi Gabe, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 460 days.

(21) Appl. No.: 12/451,382

(22) PCT Filed: Apr. 16, 2008

(86) PCT No.: PCT/JP2008/057440
§ 371 (c)(1),
(2), (4) Date: Nov. 10, 2009

(87) PCT Pub. No.: WO2008/142930
PCT Pub. Date: Nov. 27, 2008

(65) Prior Publication Data
US 2010/0115926 A1 May 13, 2010

(30) Foreign Application Priority Data
May 17, 2007 (JP) .............. P2007-131675

(51) Int. Cl.
*F01N 3/00* (2006.01)
*F01N 3/10* (2006.01)

(52) U.S. Cl. ............... 60/286; 60/300; 60/301; 60/303

(58) Field of Classification Search .......... 60/286
See application file for complete search history.

(56) References Cited

U.S. PATENT DOCUMENTS 5,782,087 A 7/1998 Kinugasa et al.
5,964,088 A * 10/1999 Kinugasa et al. ............ 60/286
(Continued)

FOREIGN PATENT DOCUMENTS

JP 09-133032 5/1997
JP 10-2219 1/1998
(Continued)

OTHER PUBLICATIONS

Patent Abstract of Japan, Publication No. 2004-211679, Published Jul. 29, 2004.

(Continued)

*Primary Examiner* — Thomas Denion
*Assistant Examiner* — Jason Shanske
(74) *Attorney, Agent, or Firm* — Staas & Halsey LLP

(57) ABSTRACT

An NOx purification system having a selective reduction catalyst, adapted so that even when no ammonia or urea is supplied, NOx is converted to ammonia by a first catalyst including a lean NOx catalyst or a ternary catalyst at ammonia formation control and the ammonia is adsorbed by the selective reduction catalyst disposed downstream and so that by the adsorbed ammonia, there is carried out reduction purification of the NOx contained in the exhaust gas when no ammonia formation control is performed by the selective reduction catalyst. At the ammonia formation control, an ammonia adsorption target amount being a target value of ammonia adsorbed by the selective reduction catalyst is computed, and the ammonia formation control is carried out only when a cumulative value of an ammonia formation amount formed by the first catalyst at the ammonia formation control is under the ammonia adsorption target amount. Consequently, ammonia is stably supplied in just proportion to the selective reduction catalyst.

14 Claims, 4 Drawing Sheets

U.S. PATENT DOCUMENTS

| | | | |
|---|---|---|---|
| 5,974,793 A * | 11/1999 | Kinugasa et al. | 60/285 |
| 6,109,024 A | 8/2000 | Kinugasa et al. | |
| 6,345,496 B1 * | 2/2002 | Fuwa et al. | 60/274 |
| 2006/0140833 A1 | 6/2006 | Morita et al. | |
| 2006/0153761 A1 * | 7/2006 | Bandl-Konrad et al. | 423/239.1 |

FOREIGN PATENT DOCUMENTS

| | | |
|---|---|---|
| JP | 11-30117 | 2/1999 |
| JP | 11-511226 | 9/1999 |
| JP | 2000-356125 | 12/2000 |
| JP | 2001-140630 | 5/2001 |
| JP | 2004-211679 | 7/2004 |
| JP | 2006-183477 | 7/2006 |

OTHER PUBLICATIONS

Patent Abstract of Japan, Publication No. 2001-140630, Published May 22, 2001.

Patent Abstract of Japan, Publication No. 10-02219, Published Jan. 6, 1998.

Patent Abstract of Europe, Publication No. 0 802 315, Published Oct. 22, 1997.

Patent Abstract of Japan, Publication No. 09-133032, Published May 20, 1997.

Patent Patent Abstract of Europe, Publication No. 0 733 354, Published May 14, 1997.

Patent Abstract of Japan, Publication No. 11-030117, Published Feb. 2, 1999.

Patent Abstract of Europe, Publication No. 0 878 609, Published Nov. 18, 1998.

Patent Abstract of Japan, Publication No. 2000-356125, Published Dec. 26, 2000.

Patent Abstract of Europe, Publication No. 1 061 244, Published Dec. 20, 2000.

Patent Abstract of Japan, Publication No. 2006-183477, Published Jul. 13, 2006.

Patent Abstract of Europe, Publication No. 1 674 682, Published Jun. 28, 2006.

Patent Abstract of Europe, Publication No. 0 796 983, Published Sep. 24, 1997.

International Search Report of the International Published Application No. PCT/JP2008/057440 (mailed Jul. 29, 2008).

Abstract of International Publication No. WO 97/15732, Published May 15, 1997.

* cited by examiner

METHOD OF CONTROLLING NOX PURIFICATION SYSTEM AND NOX PURIFICATION SYSTEM

CROSS REFERENCE TO RELATED APPLICATIONS

This application claims the benefit under U.S.C. Section 371, of PCT International Application No. PCT/JP2008/057440, filed Apr. 16, 2008 and Japanese Application No. 2007-131675 filed May 17, 2007, the contents of which are incorporated herein by reference.

TECHNICAL FIELD

The present invention relates to a method of controlling a NOx purification system capable of forming ammonia in just proportion by a NOx purification system in which ammonia is formed by a lean NOx catalyst or a ternary catalyst disposed upstream, and the formed ammonia is adsorbed by a selective reduction catalyst disposed downstream to perform reduction purification of NOx contained in the exhaust gas, and to the NOx purification system.

BACKGROUND ART

In exhaust gas purification systems for diesel engines provided with a selective reduction catalyst (SCR catalyst), an exhaust gas device provided with a selective reduction catalyst and an oxidation catalyst (DOC) in this order from the upstream side is disposed in an exhaust gas passage. By supplying an ammonia-based solution W that forms ammonia, such as urea water, from an ammonia-based solution injection device disposed upstream the exhaust gas device to the selective reduction catalyst, NOx contained in the exhaust gas and the ammonia is selectively reacted to purify the NOx.

In these exhaust gas purification systems provided with a selective reduction catalyst, harmless urea water is supplied in an exhaust gas passage and is thermally decomposed on the catalyst to form ammonia. With the selective reduction catalyst, the ammonia selectively reduces NOx contained in the exhaust gas.

In these urea-supplying NOx purification systems, however, urea is supplied as the source of forming ammonia. Accordingly, when these NOx purification systems are widely spread, since it is necessary to supply a large amount of urea, there is a problem from the standpoint of infrastructure under the present conditions.

Consequently, for example, as described in Japanese patent application Kokai publication Nos. 2004-211679 and 2001-140630, there are proposed a NOx post-treatment device and a method for an internal-combustion engine, wherein a NOx adsorbent (lean Nox trap: LNT) or an ammonia forming catalyst is disposed upstream a selective reduction catalyst, ammonia, which is formed when the exhaust gas is made be in a high temperature rich state for regenerating the NOx adsorbent and the like, is adsorbed by the selective reduction catalyst, and the adsorbed ammonia is used to reduce NOx contained in the exhaust gas during normal operation after the end of the high temperature rich state.

This ammonia is formed by the reaction between NOx contained in the exhaust gas and NOx stored by an NOx occlusion reduction type catalyst, which is one of lean NOx catalysts, and the like, and hydrogen (H) thermally decomposed from water ($H_2O$) or hydrocarbons (HC) in the exhaust gas under reduction conditions of low oxygen ($O_2$).

In such NOx purification systems, however, there is such problem that, when ammonia is not stably supplied without the check of generation conditions of ammonia or quantitative control, excess ammonia is formed to be released in air, or an inadequate amount of ammonia is formed to release NOx in air. Therefore, there is such problem that stable formation of ammonia is necessary.

SUMMARY OF THE INVENTION

The present invention was achieved to solve the problem, and a purpose thereof is to provide a method of controlling NOx purification system and a NOx purification system provided with a selective reduction catalyst, adapted so that even when no ammonia or urea is supplied, NOx is converted to ammonia by a first catalyst consisting of a lean NOx catalyst or a ternary catalyst through ammonia formation control and the ammonia is made adsorbed by the selective reduction catalyst disposed downstream, and so that, in the case where reduction purification of the NOx contained in the exhaust gas is performed by the selective reduction catalyst with the adsorbed ammonia when no ammonia formation control is performed, ammonia for use in the reduction of NOx is stably supplied in just proportion to the selective reduction catalyst.

The method of controlling NOx purification system for achieving the above purpose is a method of controlling NOx purification system of disposing a first catalyst consisting of a lean NOx catalyst or a ternary catalyst and a selective reduction type catalyst in an exhaust gas passage from the upstream side, forming ammonia by said first catalyst when carrying out the ammonia formation control to make the formed ammonia be adsorbed to said selective reduction catalyst, and, when said ammonia formation control is not carried out, reducing NOx contained in the exhaust gas with the ammonia adsorbed to said selective reduction catalyst, wherein, at said ammonia formation control, an ammonia adsOrption target amount being a target value of ammonia adsorbed by said selective reduction catalyst is computed, and said ammonia formation control is carried out only when the cumulative value of the ammonia formation amount formed by said first catalyst with said ammonia formation control is under said ammonia adsorption target rate.

That is, ammonia is formed by the former first catalyst upstream consisting of a lean NOx catalyst or a ternary catalyst. The formed ammonia is made adsorbed by the latter selective reduction catalyst downstream to reduce NOx contained in the exhaust gas to render the gas harmless. On this occasion, in order to avoid an excessive or inadequate amount of ammonia, in the ammonia formation control, ammonia is formed only when the cumulative value of the ammonia formation amount formed by the control is under the ammonia adsorption target amount at the selective reduction catalyst. This can prevent the outflow of the ammonia from the selective reduction catalyst.

In the method of controlling NOx purification system, when not performing said ammonia formation control, the amount of ammonia adsorbed by said selective reduction catalyst is computed, and, when the ammonia adsorbed amount becomes an amount not more than a prescribed ammonia formation starting amount, said ammonia formation control is started. This can prevent the outflow of NOx from the selective reduction catalyst caused by the shortage of ammonia adsorbed by the selective reduction catalyst.

In the method of controlling NOx purification system, said ammonia adsorption target amount is computed from the ammonia adsorption upper limit amount capable of being adsorbed by said selective reduction catalyst and the amount of ammonia adsorbed by said selective reduction catalyst at starting said ammonia formation control. This enables an appropriate ammonia adsorption target amount to be computed comparatively easily. Meanwhile, the allowable ammonia adsorption upper limit amount capable of being adsorbed by the selective reduction catalyst depends on the temperature of the selective reduction catalyst. Therefore, the temperature and the allowable ammonia adsorption upper limit amount are to be checked previously by tests and the like. The ammonia adsorption upper limit amount is set with latitude relative to the allowable ammonia adsorption upper limit amount. The preset rate is previously stored in a device controlling the NOx purification system.

In the method of controlling NOx purification system, at computing said ammonia adsorption target amount, at least one of map data of the amount of NOx flowing out of said first catalyst, and map data of the ammonia adsorption upper limit amount capable of being adsorbed by said selective reduction catalyst. This makes the computation easy. The outflow amount of NOx mainly relates to an engine speed or a fuel injection amount (or load), and the ammonia adsorption upper limit amount relates to the temperature of the selective reduction catalyst. These map data of the NOx outflow amount and map data of the ammonia adsorption upper limit amount are to be checked previously by tests and the like, which are stored by a device for controlling the NOx purification system. Meanwhile, here, the map data also include data having one parameter (data usually referred to as a table).

In the method of controlling NOx purification system, in said ammonia formation control, the control of an air/fuel ratio of the exhaust gas is performed, in which the air/fuel ratio is made be in a deep rich state, only when the temperature of said first catalyst is not less than a prescribed temperature, or the temperature of said first catalyst becomes not less than said prescribed temperature by the control of the catalyst temperature rise. This enables ammonia to be formed effectively. This aims not to lead the air/fuel ratio condition to a deep rich condition uselessly, because ammonia is hardly formed when the temperature of the first catalyst is low. This can suppress the change of the fuel consumption for the worth.

In the method of controlling NOx purification system, at said ammonia formation control, the air/fuel ratio of the exhaust gas is controlled according to the map data of the ammonia formation amount including the temperature of said first catalyst and the air/fuel ratio of the exhaust gas as parameters. This enables the ammonia formation rate to be adjusted appropriately. Accordingly, while avoiding the outflow of the ammonia toward the downstream side of the selective reduction catalyst, it becomes possible to form ammonia more effectively, for example, so as to reduce the fuel cost.

In the method of controlling NOx purification system, in said ammonia formation control, an intra-exhaust pipe fuel injection is carried out, and either catalyst temperature rise or ammonia formation, or both of them are performed. This can simplify fuel injection control, and reduce torque variation generated by the engine, as compared with the case of adding fuel in the exhaust passage by an intra-cylinder fuel injection control.

Further, the NOx purification system for achieving the purpose is a NOx purification system in which a first catalyst consisting of a lean NOx catalyst or a ternary catalyst and a selective reduction type catalyst are disposed in the exhaust gas passage from the upstream side, ammonia is formed by said first catalyst when an ammonia formation control is carried out, and the formed ammonia is made adsorbed by said selective reduction catalyst and, when said ammonia formation control is not carried out, NOx contained in the exhaust gas is reduced with ammonia adsorbed by said selective reduction catalyst, wherein the purification system is constituted while being provided with a NOx purification control device means that computes an ammonia adsorption target amount being a target value of ammonia to be adsorbed by said selective reduction catalyst, and that carries out said ammonia formation control only when the cumulative value of the ammonia formation amount formed by said first catalyst by said ammonia formation control is under said ammonia adsorption target amount, at said ammonia formation control. This can prevent the outflow of ammonia from the selective reduction catalyst.

In the NOx purification system, said NOx purification control means is constituted while having an ammonia formation start decision means that computes an ammonia adsorption amount adsorbed by said selective reduction catalyst when said ammonia formation control is not carried out, and that decides to start said ammonia formation control when the ammonia adsorption amount becomes not more than a prescribed ammonia formation starting amount. This can prevent the outflow of NOx from the selective reduction catalyst caused by the shortage of the ammonia adsorbed by the selective reduction catalyst.

The NOx purification system is constituted so that said NOx purification control means computes said ammonia adsorption target amount from the ammonia adsorption upper limit amount capable of being adsorbed by said selective reduction catalyst, and the ammonia adsorption amount adsorbed by said selective reduction catalyst at starting said ammonia formation control. This enables an appropriate ammonia adsorption target amount to be computed comparatively easily.

In the NOx purification system, said NOx purification control means is constituted so as to use, at the computation of said ammonia adsorption target amount, at least one of map data of the NOx outflow amount flowing out of said first catalyst, and map data of the ammonia adsorption upper limit amount capable of being adsorbed by said selective reduction catalyst. This makes the computation easy.

In the NOx purification system, said NOx purification control means is constituted so as to perform the exhaust gas air/fuel ratio control for making the air/fuel ratio of the exhaust gas be in a deep rich state only when the temperature of said first catalyst is not less than a prescribed temperature, and the temperature of said first catalyst becomes not less than a prescribed temperature by the catalyst temperature rise control, at said ammonia formation control. This enables ammonia to be formed effectively.

In the NOx purification system, said NOx purification control means is constituted so as to control the air/fuel ratio of the exhaust gas according to map data of the ammonia formation amount having the temperature of said first catalyst and the air/fuel ratio of the exhaust gas as parameters, at said ammonia formation control. This enables the ammonia formation amount to be adjusted appropriately.

In the NOx purification system, said NOx purification control means is constituted so as to carry out the intra-exhaust pipe fuel injection, and to perform either the catalyst temperature rise or the ammonia formation, or the both of them, at said ammonia formation control. This can make the fuel injection control simple, and the torque variation generated from the engine small, as compared with the case of adding fuel in the exhaust gas passage by the intra-cylinder fuel injection control.

According to the method of controlling NOx purification system and the NOx purification system according to the present invention, in a NOx purification system disposed with a first catalyst consisting of a lean NOx catalyst or a ternary catalyst, and a selective reduction type catalyst in the exhaust gas passage from the upstream side, ammonia is formed by the first catalyst when the ammonia formation control is carried out by the NOx purification system and the formed ammonia is made adsorbed by the selective reduction catalyst, and, when no ammonia formation control is carried out, NOx contained in the exhaust gas is reduced by the ammonia adsorbed by the selective reduction catalyst, wherein excess supply of ammonia to the selective reduction catalyst can be avoided to prevent the outflow of ammonia toward the downstream side of the selective reduction catalyst.

By computing the ammonia adsorption amount adsorbed by the selective reduction catalyst and starting the ammonia formation control when the ammonia adsorption amount becomes not more than a prescribed ammonia formation starting amount, at carrying out no ammonia formation control, the outflow of NOx toward the downstream side of the selective reduction catalyst, which is caused by the shortage of ammonia adsorbed by the selective reduction catalyst for reducing the NOx flowing out toward the downstream side of the first catalyst when no ammonia formation control is carried out, can be prevented.

DESCRIPTION OF THE EMBODIMENTS

Figure 1:
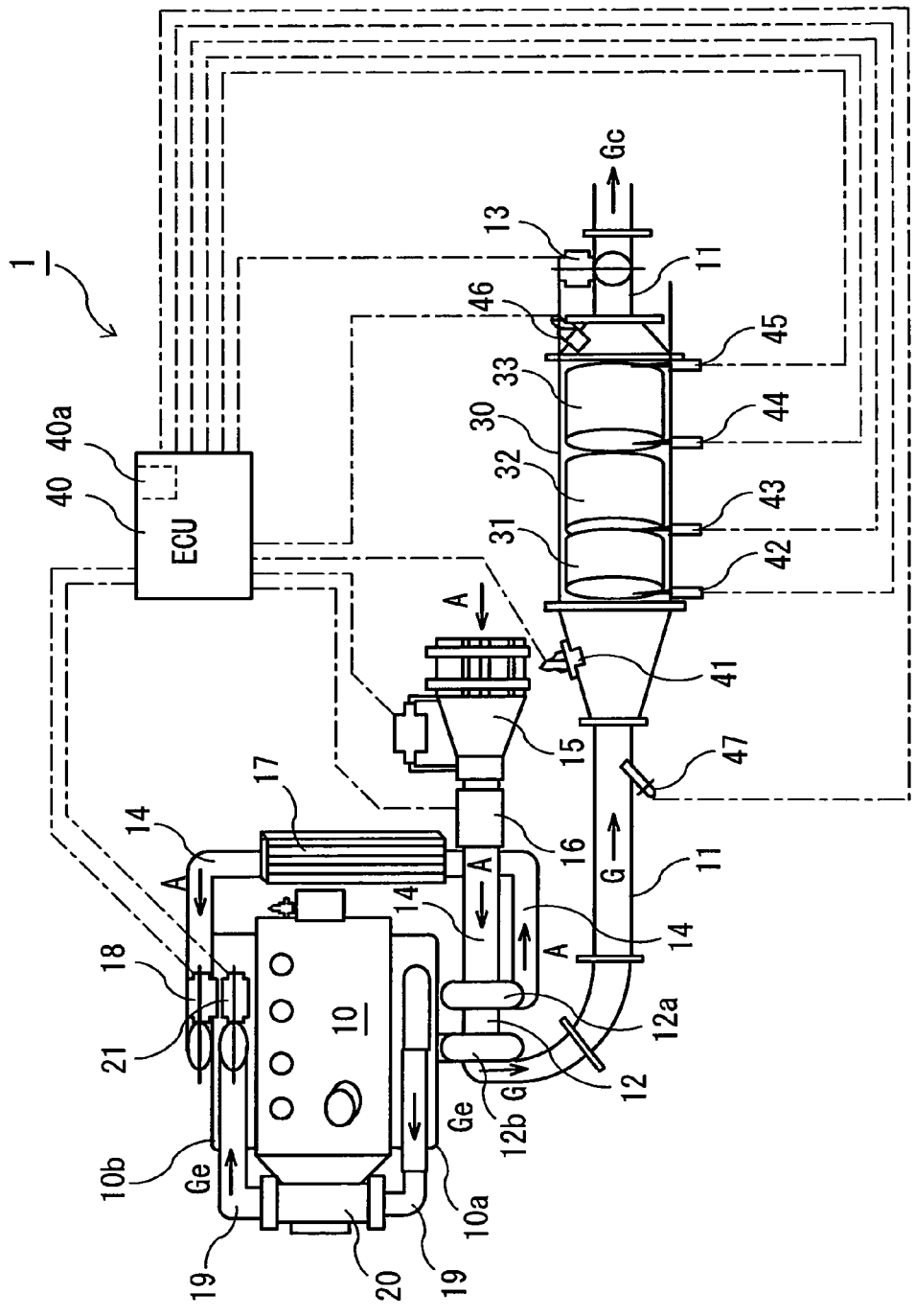
FIG. 1 shows the NOx purification system according to a first embodiment of the present invention.

Hereinafter, a method of controlling NOx purification system and the NOx purification system according to the present invention will be described while taking a NOx purification system for purifying NOx contained in exhaust gas passing through an exhaust gas passage of a diesel engine as an example, referring to drawings. FIG. 1 shows constitution of a NOx purification system 1 of an embodiment of the present invention.

In the NOx purification system 1, a NOx purification device 30 and an exhaust throttle valve 13 are disposed at an exhaust passage (exhaust gas passage) 11 of a diesel engine 10. The NOx purification device 30 includes, from an upstream side, a turbine 12a of a turbocharger 12, an oxidation catalyst (DOC) 31, a lean NOx catalyst (LNT) 32, and a selective reduction type catalyst (SCR catalyst) 33. The lean NOx catalyst 32 is referred to hereafter as a first catalyst.

The oxidation catalyst 31 is formed by supporting rhodium, cerium oxide, platinum and aluminum oxide on a carrier having a honeycomb structure of porous ceramic such as cordierite honeycomb. The oxidation catalyst 31 oxidizes unburned fuel (hydrocarbon: HC) or carbon monoxide (CO) in the exhaust gas, if any. By the heat generated by the oxidation, it is possible to raise the temperature of the exhaust gas, and, by the heated exhaust gas, to raise the temperature of the lean NOx catalyst (the first catalyst) 32 downstream. Meanwhile, the oxidation catalyst 31 may be disposed as a part of a continuous regeneration type diesel particulate filter device (continuous regeneration type DPF device).

In the embodiment, the lean NOx catalyst (LNT) 32 is formed of a NOx occlusion reduction type catalyst. The NOx occlusion reduction type catalyst is constituted by disposing a porous catalyst coating layer formed of aluminum oxide (alumina) and the like on a carrier of a honeycomb structure of a porous ceramic such as cordierite honeycomb. On the catalyst coating layer, a catalyst noble metal such as platinum and a NOx storage material having a NOx storage function are carried. As the NOx storage material, one of alkali metals such as potassium, sodium, lithium and cesium, alkali earth metals such as barium and calcium, and rare earths such as lanthanide and yttrium, or combinations of some of these, may be used. By the constitution, two functions, NOx storage and NOx release/purification, are exerted depending on the oxygen concentration in the exhaust gas and the like.

The selective reduction catalyst 33 is formed by supporting titania-vanadium, zeolite, chromium oxide, manganese oxide, molybdenum oxide, titanium oxide, tungsten oxide and the like on a carrier such as a honeycomb structure formed of cordierite, aluminum oxide, titanium oxide and the like. By the constitution, it becomes possible to adsorb ammonia, and to perform reduction purification of NOx with ammonia.

Further, in order to control the air excess ratio (λ) at the ammonia formation, an air/fuel ratio (A/F) sensor 41 is disposed upstream the oxidation catalyst 31. In addition, in order to estimate the temperature of respective catalysts 31, 32, 33, there are disposed, respectively, a first temperature sensor 42 upstream the oxidation catalyst 31, a second temperature sensor 43 between the oxidation catalyst 31 and the lean NOx catalyst 32, a third temperature sensor 44 between the lean NOx catalyst 32 and the selective reduction catalyst 33, and a fourth temperature sensor 45 downstream the selective reduction catalyst 33. Furthermore, on the downstream side of the selective reduction catalyst 33, a NOx or λ (air excess ratio) sensor 46 is disposed. Meanwhile, when performing the intra-exhaust pipe fuel injection, a fuel injection valve (intra-exhaust pipe fuel injection device) 47 is disposed in the exhaust gas passage (exhaust pipe) 11 upstream the air/fuel ratio (A/F) sensor 41.

Further, in an air intake passage 14, there are disposed an air filter 15, a mass air flow sensor (MAF sensor) 16, a compressor 12b of the turbocharger 12, an intercooler 17, and an intake throttle valve 18. Further, in an EGR passage 19 connecting between an exhaust manifold 10a and an intake manifold 10b, an EGR cooler 20 and an EGR valve 21 are disposed.

In the engine 10, the air A is purified by the air filter 15, and, next, the mass flow rate thereof is measured with the mass air flow sensor (MAF sensor) 16 to be compressed with the compressor 12b. After that, the air A is cooled by the intercooler 17, and passes through the intake throttle valve 18 to enter the intake manifold 10b. The intake throttle valve 18 adjusts the flow rate of the air A. In the cylinder of the engine 10, fuel is injected into the air A to be burned. The exhaust gas G formed by the combustion drives the turbine 10a in the exhaust passage (exhaust gas passage) 11 after being exhausted from the exhaust manifold 10a, and, then, passes through the NOx purification device 30 to become purified exhaust gas Gc. After that, the purified exhaust gas Gc passes through the exhaust throttle valve 13 and a muffler (silencer, not shown) to be discharged into air. Further, a part of the exhaust gas G is, as an EGR gas Ge, cooled by an EGR cooler 19 in the EGR passage 19, and, then, passes through an EGR valve 21 and enters the intake manifold 10b to be mixed with the air A to enter the cylinder. The EGR valve 21 adjusts the flow rate of the EGR gas Ge.

For controlling these NOx purification system 1, a NOx purification control device 40a is disposed. The NOx purification device 40a is usually constituted in such state as being included in an engine control unit (ECU) 40 that controls the whole engine. To the NOx purification control device 40a, in addition to the input from the air/fuel ratio sensor 41, first to fourth temperature sensors 42, 43, 44, 45 and the NOx or the λ sensor 46 and the like, an engine speed Ne, fuel injection amount (or load) Q and the like are input. The NOx purification control device 40a has a close relationship with the engine control unit 40, and, via the engine control unit 40, controls the intra-cylinder fuel injection, the exhaust throttle valve 13, the intake throttle valve 18, the EGR valve 21, the fuel injection valve 47 and the like.

Figure 2:
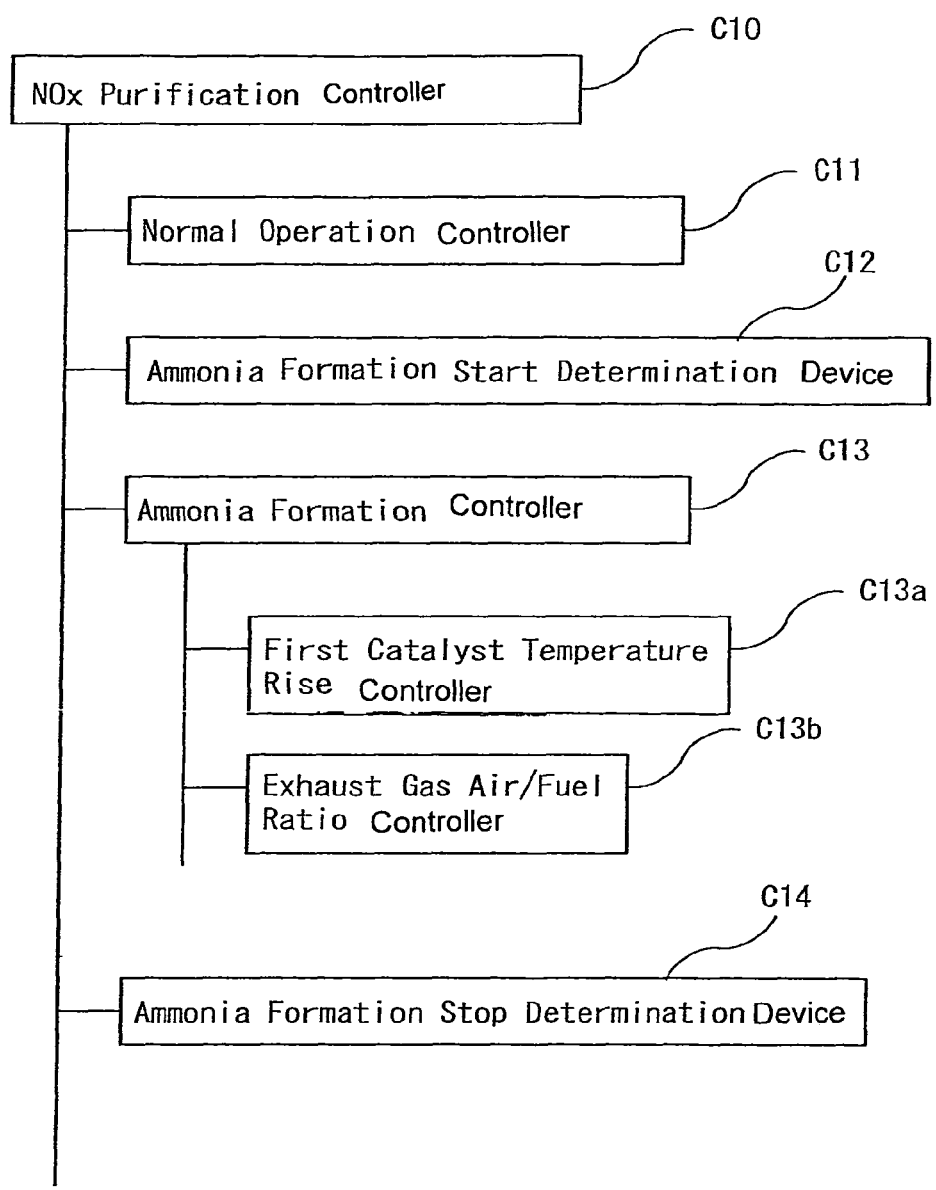
FIG. 2 is shows the NO purification control of the NOx purification system according to the present invention.

In addition, the NOx purification control device 40a has a NOx purification controller C10, as shown in FIG. 2. The constitution of the NOx purification controller C10 includes a normal control controller C11, an ammonia formation start determination device C12, an ammonia formation controller C13, an ammonia formation stop determination device C14 and the like. The constitution of the ammonia formation controller C13 includes a first catalyst temperature rise controller Cl3a and an exhaust gas air/fuel ratio control means controller 13b.

The normal operation controller C11 performs normal operation of an engine, in other words, performs an operation control without performing the ammonia formation control. In the normal operation, NOx contained in the exhaust gas is stored in the lean NOx catalyst 32. The ammonia formation start determination device C12 decides when to start the ammonia formation control. The device C12 computes an ammonia adsorption amount A1 adsorbed by the selective reduction catalyst 33, and decides to start the ammonia formation control when the ammonia adsorption amount A1 becomes not more than a prescribed ammonia formation starting amount As. That is, when the ammonia adsorbed by the selective reduction catalyst 33 decreases by being used for the reduction of NOx flowing out of the lean NOx catalyst 32 at the normal operation, and the ammonia adsorption amount A1 by the selective reduction catalyst 33 becomes not more than a prescribed ammonia formation starting amount As, the device decides to start the ammonia formation control.

Figure 7:
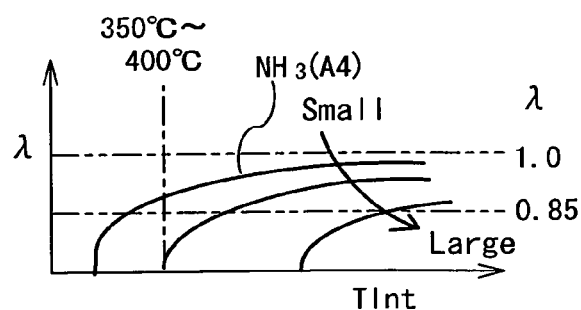
FIG. 7 is a schematic view for explaining the computation method of the ammonia formation amount.

The ammonia formation controller C13 is for performing the ammonia formation. It is known that ammonia is formed under such conditions that the temperature of the lean NOx catalyst 32 is high (for example, 400° C.) and the exhaust gas is in a deep rich state (for example, $\lambda \leq 0.85$, in terms of the air excess ratio). This is because, in the rich state at high temperature where a catalyst reaction proceeds quickly, $NO_2$ adsorbed by the lean NOx catalyst 32 is released and follows the formula: $2NO_2+CO+2HC \rightarrow N_2+2CO_2+H_2O$. However, if oxygen is not enough at the reaction, $H_2$ is formed according to a reaction $CO+H_2O \rightarrow CO_2+H_2$ or a reaction $C_3H_6 +3H_2O \rightarrow 3CO+6H_2$. Further, according to a reaction $2NO +5H_2 \rightarrow 2NH_3 +2H_2O$ or a reaction $2NO_2+7H_2 \rightarrow 2NH_3+4H_2O$, $NH_3$ is generated, and ammonia ($NH_3$) is formed in place of nitrogen ($N_2$). For the purpose of positively utilizing the generation of ammonia, map data of an ammonia formation amount having the catalyst temperature Tint of the lean NOx catalyst 32 and the air/fuel ratio (or air excess ratio λ) of the exhaust gas as parameters are previously stored by the NOx purification control device 40a. FIG. 7 shows the map data.

The specific map data are produced on the basis of test results and the like. Then, while using the catalyst temperature Tint and the air/fuel ratio as control elements, the exhaust gas air/fuel ratio is controlled at an air/fuel ratio previously set so as to give an appropriate ammonia formation amount relative to the measured catalyst temperature Tint. The air/fuel ratio is usually λ=0.95 to 0.85 in terms of the air excess ratio, preferably λ=0.92 to 0.87.

In the ammonia formation controller C13, the temperature of the lean NOx catalyst 32 is increased to a prescribed temperature (for example, 400° C.) or more that enables ammonia to be formed, according to need, by increasing the exhaust gas temperature by the first catalyst temperature rise controller C13a, or by directly heating the lean NOx catalyst (the first catalyst) 32 by an electric heater. Meanwhile, when the lean NOx catalyst 32 has already been at a prescribed temperature or more that enables ammonia to be formed, the temperature rise control of the first catalyst is not performed.

The exhaust gas air/fuel ratio controller C13b sets the air/fuel ratio to be a previously set air/fuel ratio. During the exhaust gas air/fuel ratio control, the lean NOx catalyst 32 releases the stored NOx, and a part of the released NOx is decomposed to nitrogen ($N_2$). A part of the remains of the released NOx is converted to ammonia. Further, NOx contained in the exhaust gas is also converted to ammonia by the lean NOx catalyst 32. The ammonia is adsorbed in the selective reduction catalyst 33 downstream.

These first catalyst temperature rise controller C13a and exhaust gas air/fuel ratio controller C13b use multiple injection (multiple stage retarded injection) and post-injection in the intra-cylinder fuel injection, or use multiple injection in the intra-cylinder fuel injection and intra-exhaust tube fuel injection.

The ammonia formation stop determination device C14 computes the ammonia adsorption target amount At being a target value of ammonia to be adsorbed by the selective reduction catalyst 33, and terminates the ammonia formation control when the cumulative value A3 of the ammonia formation amount A4 formed by the lean NOx catalyst 32 during the ammonia formation control reaches the ammonia adsorption target amount At.

In order to perform these controls, the NOx outflow amount map of the lean NOx catalyst 32, the ammonia adsorption upper limit amount table of the selective reduction catalyst 33, the ammonia formation amount map formed by the lean NOx catalyst 32 and the like are previously prepared on the basis of test results, and are previously stored in the NOx purification control device 40a. The NOx outflow amount map is map data of a NOx outflow amount N1 (FIG. 4) having the engine speed Ne and fuel injection amount (or load) Q as parameters. The ammonia adsorption upper limit amount table is a table showing an ammonia adsorption upper limit amount Au (FIG. 6) having a catalyst temperature Tscr as a parameter. The ammonia formation amount map is map data showing an ammonia formation amount A4 (FIG. 7) having the catalyst temperature Tlnt of the lean NOx catalyst 32 and the air excess ratio λ (air/fuel ratio) as parameters.

Figure 3:
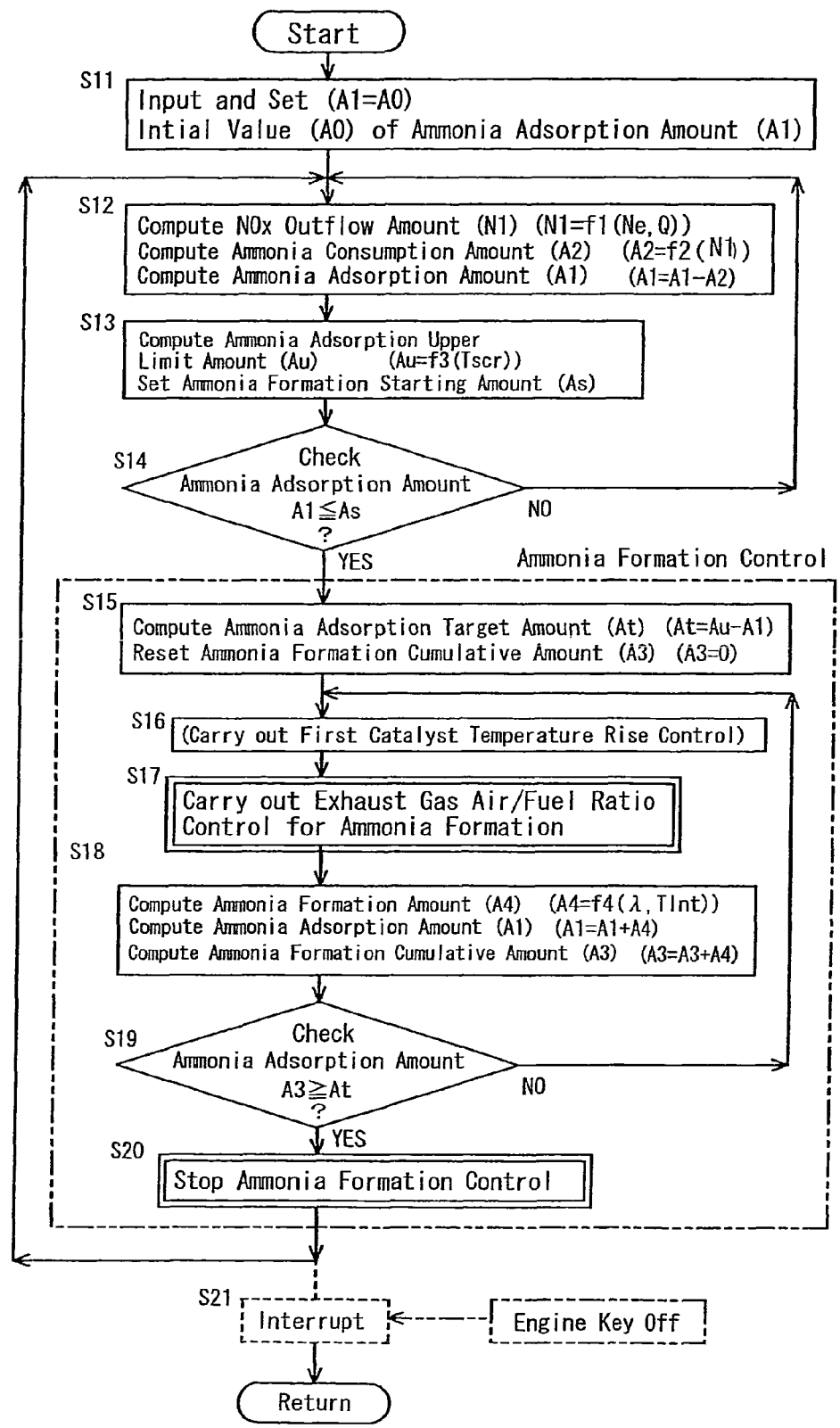
FIG. 3 is a control flow diagram showing the method of controlling the NOx purification system according to the present invention.

Next, the control method of a NOx purification system in the NOx purification system 1 is described. The control method is performed according to a control flow as exemplified in FIG. 3. The control flow in FIG. 3 is shown as a following control flow. At the same time of starting an engine, the control flow is called out from the main control flow that performs general control of the engine, and is started. Further, when the end of the engine driving such as turning off the engine key is detected, an interrupt occurs to return to the main control flow, and, at the same time of the end of the main control flow, the control flow ends.

When turning on the engine key to start the engine driving, the control flow in FIG. 3 also is called out from the main control flow and is started. After the start, firstly, at Step S11, the initial value A0 of the ammonia adsorption amount A1 being the estimated value of the ammonia adsorption amount adsorbed by the selective reduction catalyst 33 is input from a prescribed memory of the NOx purification control device 40a, and the ammonia adsorption amount A1 is set to the initial value A0 (A1=A0). The initial value A0 is an estimated value of ammonia adsorption amount adsorbed by the selective reduction catalyst 33.

The initial value A0 is 0 (zero) when the engine is started for the first time, but, when the control flow in FIG. 3 is already carried out in the latest engine driving, it is the ammonia adsorption amount A1 at the latest engine stop. That is, the value of the ammonia adsorption amount A1 at the latest operation stop is retained as the initial value A0.

Figure 4:
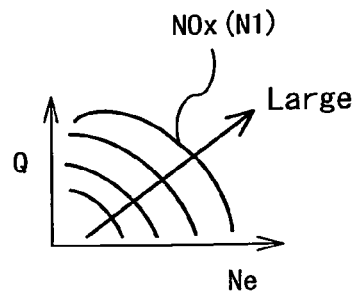
FIG. 4 is a schematic view for explaining the computation method of the NOx outflow amount.

At the next Step S12, the NOx outflow amount (NOx slip amount) N1 from the lean NOx catalyst 32 to the selective reduction catalyst 33 produced during a prescribed time interval lying within Step S12 and the end of Step S14, in other words, during the interval of the ammonia adsorption amount check at Step S14 is computed. At the computation, NOx outflow amount map data (as shown in FIG. 4) having the engine speed Ne and the fuel injection amount (or load) Q as parameters, or, a function value N1=f1(Ne, Q) is used. That is, from the engine speed Ne and the fuel injection amount Q, the NOx outflow amount N1 is computed, while referring to NOx outflow amount map data or carrying out the operation by the function f1(Ne, Q).

Figure 5:
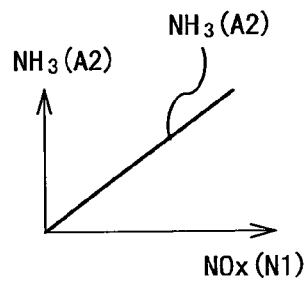
FIG. 5 is a schematic view for explaining the computation method of the ammonia consumption amount.

From the NOx outflow amount N1, the ammonia consumption amount A2 for use in NOx reduction, in other words, the ammonia amount A2 necessary for the reduction of the NOx outflow amount N1 is computed. For the computation, calculation of the equivalent ratio of NOx (NO, $NO_2$)—$NH_3$ is used. Alternatively, map data (as shown in FIG. 5) showing the ammonia consumption amount A2 relative to the NOx outflow amount N1, or a function value A2=f2(N1) may be used. Meanwhile, the ammonia consumption amount A2 may be corrected while taking the reduction efficiency of NOx into consideration. Furthermore, the ammonia adsorption amount A1 after the end of Step S14 is computed by subtracting the ammonia consumption amount A2 from the ammonia adsorption amount A1 until Step S12 (A1=A1−A2).

Figure 6:
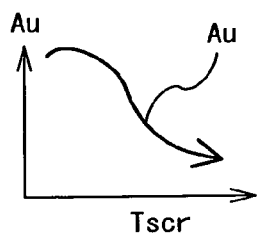
FIG. 6 is a schematic view for explaining the computation method of the ammonia adsorption upper limit amount.

At the next Step S13, the ammonia adsorption upper limit amount Au is computed from the catalyst temperature Tscr of the selective reduction catalyst 33. The ammonia adsorption upper limit amount Au is the ammonia rate capable of being adsorbed by the selective reduction catalyst 33. In the computation, map data (as shown in FIG. 6) showing the ammonia adsorption upper limit amount Au relative to the catalyst temperature Tscr, or a function value Au =f3(Tscr) is used. Meanwhile, it is preferable to set the ammonia adsorption upper limit amount Au not to be the upper limit value itself of the physical adsorption amount, but to be a value having some allowance.

At Step S13, the ammonia formation starting amount As is set. The ammonia formation starting amount As is a value used for starting the ammonia formation control when the ammonia adsorption amount A1 at the selective reduction catalyst 33 becomes not more than the value, to make the formed ammonia adsorbed by the selective reduction catalyst 33. The ammonia formation starting amount As is previously set on the basis of test results and the like, and is stored in a prescribed memory of the NOx purification control device 40a. The stored value is read out to set the ammonia formation starting amount As in the control flow as shown in FIG. 3. Further, a constitution, in which the ammonia formation starting amount As is corrected while taking the catalyst temperature Tscr into consideration, may also be adopted. The ammonia formation starting amount As, too, is preferably set to be a value having some allowance while taking the ammonia consumption amount A2 consumed in the first catalyst temperature rise control and the like at Step S16 into consideration.

At next Step S14, the ammonia adsorption amount A1 is checked, and whether the ammonia adsorption amount A1 is not more than the ammonia formation starting amount As or not is decided. On the basis of the decision, whether the ammonia formation control is to be started or not is decided. That is, when it is not more, the operation moves to the ammonia formation control at Step S15 and thereafter, to carry out the ammonia formation control and form ammonia, and to make the ammonia adsorbed by the selective reduction catalyst 33. When it is more, there is no necessity yet to make ammonia adsorbed by the selective reduction catalyst 33, and the flow returns to Step S12.

In the ammonia formation control at Steps S15 to S20, firstly, at Step S15, the ammonia adsorption target amount At being a target value of ammonia adsorbed by the selective reduction catalyst 33 is computed. The ammonia adsorption target amount At is also a target value of the ammonia formation amount formed by the forthcoming ammonia formation control, it can be referred to as an ammonia formation target amount. The ammonia adsorption target amount At is computed by subtracting the current (at Step S15) ammonia adsorption amount A1 from the ammonia adsorption upper limit amount Au (At=Au−A1). Further, in order to accumulate ammonia amount formed by the ammonia formation control, ammonia formation cumulative amount A3 is reset to be zero (A3=0).

At subsequent Step S16, according to need, the first catalyst temperature rise control is performed. That is, when the catalyst temperature Tint of the lean NOx catalyst (the first catalyst) 32 has reached a prescribed temperature (for example, 350° C. to 400° C.), the first catalyst temperature rise control is not performed to proceed to next Step S17. However, when the catalyst temperature Tint has not reached the prescribed temperature, the lean NOx catalyst 32 is heated to increase the temperature by a following method, without leading the exhaust gas to a deep rich state. That is, the temperature of the exhaust gas is increased by intake tightening, EGR control, intra-cylinder fuel injection and the like to be a temperature that enables the intra-exhaust pipe fuel injection possible (for example, not less than 200° C.), and, then, the intra-exhaust pipe fuel injection is carried out in pulse, unburned fuel in the exhaust gas is oxidized by the oxidation catalyst 31, or it is directly heated with a heat transfer heater. Then, after the catalyst temperature Tint reaches a prescribed temperature, the flow moves to subsequent Step S17. Meanwhile, during the first catalyst temperature rise control within the interval, although not shown in the control flow in FIG. 3, the ammonia adsorption amount A1 considering the ammonia consumption amount A2 is computed by performing an operation similar to that at Step S12.

In the exhaust gas air/fuel ratio control for forming ammonia at Step S17, by the intake tightening, EGR control, intra-cylinder fuel injection and the like, a deep rich state such as $\lambda$=0.95 to 0.85, preferably $\lambda$=0.92 to 0.87 in terms of the air excess ratio is increased or decreased in pulse for the air/fuel ratio of the exhaust gas to lead to an intermittent rich air/fuel ratio, to form ammonia. At this time, the intra-exhaust pipe fuel injection is occasionally used in combination. On this occasion, for the target value of the injection amount of the intra-exhaust pipe fuel injection, a fuel flow amount that gives a target air/fuel ratio (A/F) is computed from an air rate and λ sensor value. As the result of the control, the NOx stored by the lean NOx catalyst 32 and the NOx contained in the exhaust gas are converted to ammonia, to form ammonia. The formed ammonia is adsorbed in the selective reduction catalyst 33 downstream.

At subsequent Step S18, the ammonia formation amount A4, which is formed during a prescribed time interval from Step S17 until the end of Step S19, in other words, during an interval for checking the ammonia adsorption amount A1 at Step S19, is computed. At this computation, NOx formation amount map data (as shown in FIG. 7) having the catalyst temperature Tlnt and the air excess ratio λ (or the air/fuel ratio A/F) as parameters, or a function value A4=f4(Tlnt, λ) is used. That is, the NOx formation amount A4 is computed from the catalyst temperature Tlnt and the air excess ratio λ, while referring to map data or performing a function operation.

At subsequent Step S18, the ammonia formation amount A4, which is formed during a prescribed time interval from Step S17 until the end of Step S19, in other words, during an interval for checking the ammonia adsorption amount Al at Step S19, is computed. At this computation, NOx formation amount map data (as shown in FIG. 7) having the catalyst temperature Tint and the air excess ratio λ(or the air/fuel ratio A/F) as parameters, or a function value A4 =f4(TInt, λ) is used. That is, the ammonia formation amount A4 is computed from the catalyst temperature Tint and the air excess ratio λ, while referring to map data or performing a function operation.

Further, from the ammonia formation amount A4, an ammonia adsorption amount A1 after the end of Step S19 is computed by adding the ammonia formation amount A4 to the ammonia adsorption amount A1 until Step S16 (A1=A1+ A4). Furthermore, in order to decide the stop time of the ammonia formation control, the ammonia formation cumulative amount A3 is computed. In this case, the computation is performed adding the ammonia formation amount A4 to the ammonia formation cumulative amount A3 until Step S16 (A3=A3+A4). Meanwhile, the formation cumulative amount A3 may be corrected while taking the ammonia adsorption efficiency by the selective reduction catalyst 33 into consideration, but, the computation of the ammonia adsorption target amount At, while taking the ammonia adsorption efficiency into consideration, can simplify the control.

Meanwhile, after resetting the ammonia formation cumulative amount A3 and passing through Step S17, when the catalyst temperature rise control at Step S16 is performed again because the temperature of the lean NOx catalyst 32 has lowered as compared with a prescribed temperature, the ammonia consumption amount A2 during the interval is subtracted (A3=A3−A2).

At Step S19, the ammonia formation cumulative amount A3 is checked, and whether the ammonia formation cumulative amount A3 is not more than the ammonia adsorption target amount At or not is decided. On the basis of the decision, whether the ammonia formation control may be stopped or not is decided. That is, when A3 is not less, it is no longer necessary to make ammonia adsorbed by the selective reduction catalyst 33. Therefore, the flow proceeds to Step S20, to stop the ammonia formation control. That is, the first catalyst temperature rise control for the ammonia formation and the exhaust gas air/fuel ratio control for making the exhaust gas be in a deep rich state are stopped, and the flow returns to Step S12. When the above is not applicable, the flow returns to Step S16, and the ammonia formation control is continued to form ammonia, and the ammonia is further adsorbed in the selective reduction catalyst 33.

Then, while repeatedly performing Steps S12 to S20, in normal engine control operations (Steps S11 to S14, S15: ammonia formation control is not performed) and the first catalyst temperature rise control (Step S16), the exhaust gas G becomes in a lean state. Almost all NOx contained in the exhaust gas is absorbed by the lean NOx catalyst 32. The remaining NOx that outflows from the lean NOx catalyst is reduced to nitrogen at the selective reduction catalyst 33 by ammonia adsorbed by the selective reduction catalyst 33. This changes the exhaust gas to a purified gas Gc, which is released into air.

When the adsorption amount A1 of ammonia adsorbed by the selective reduction catalyst 33 becomes low, there occurs such possibility that, because of ammonia shortage, the flowing out NOx is not reduced and is released into air. In order to prevent this, when the ammonia adsorption amount A1 reaches the ammonia formation starting amount As, a normal engine control operation transfers to the ammonia formation control.

In the ammonia formation control, after performing the first catalyst temperature rise control according to need, in the exhaust gas air/fuel ratio control (Steps S17 to S19) for ammonia formation, the exhaust gas is made be in a deep rich state. This releases the NOx stored by the lean NOx catalyst 32, and reduces the released NOx under a low oxygen condition to form ammonia. The formed ammonia is made adsorbed by the selective reduction catalyst 33 to increase the ammonia amount A1 adsorbed by the selective reduction catalyst 33 and to recover it up to the ammonia adsorption upper limit amount Au. Then, when the ammonia adsorption amount A1 recovers to the ammonia adsorption upper limit amount Au, the ammonia formation control is stopped to return again to a normal operation.

When an operation for stopping the engine driving is performed by turning off an engine key in repeatedly performing Steps S12 to S20, the operation is detected and an interrupt is generated on the way of Steps being performed to go to interrupt Step S21. The interrupt performs completing works (not shown) of the control flow. As the completing work, for example, there are such works as making the ammonia adsorption amount A1 stored by a prescribed memory of the NOx purification control device 30 as the initial value A0 of next ammonia adsorption amount A1, and as stopping various kinds of controls.

According to the method of controlling NOx purification system and the NOx purification system 1 having the above-described constitution, at the ammonia formation control, the ammonia adsorption target amount At being the target value of ammonia adsorbed by the selective reduction catalyst 33 is calculated, and the ammonia formation control is carried out only when the cumulative value A3 of the ammonia formation amount A4 formed by the first catalyst 32 by the ammonia formation control is under the ammonia adsorption target amount At. The outflow of ammonia from the selective reduction catalyst 33 can be thereby prevented.

Further, at not carrying out the ammonia formation control, the ammonia adsorption amount A1 adsorbed by the selective reduction catalyst 33 is computed, and the ammonia formation control is started when the ammonia adsorption amount A1 becomes under a prescribed ammonia formation starting amount As. The outflow of NOx from the selective reduction catalyst 33 caused by the shortage of ammonia adsorbed by the selective reduction catalyst 33 can be thereby prevented.

Further, the ammonia adsorption target amount At is computed from the ammonia adsorption upper limit amount Au capable of being adsorbed by the selective reduction catalyst 33, and the ammonia adsorption amount A1 adsorbed by the selective reduction catalyst 33 at starting the ammonia formation control, according to At=Au−A1. An appropriate ammonia adsorption target amount can be thereby computed comparatively easily.

Furthermore, at computing the ammonia adsorption target amount At, both the map data of the NOx outflow amount flowing out from the first catalyst 32, and the map data of the ammonia adsorption upper limit amount Au capable of being adsorbed by the selective reduction catalyst 33 are used. The computation of the ammonia adsorption target amount At can be thereby easy.

Furthermore, in the ammonia formation control, the exhaust gas air/fuel ratio control for making the air/fuel ratio of the exhaust gas be in a deep rich state is performed only when the temperature Tlnt of the first catalyst 32 is not less than a prescribed temperature, and the temperature Tlnt of the first catalyst 32 becomes not less than a prescribed temperature by the first catalyst temperature rise control. Ammonia can be thereby formed effectively.

Furthermore, at the ammonia formation control, the air/fuel ratio of the exhaust gas is controlled according to the map data of the ammonia formation amount A4 having the temperature Tlnt of the first catalyst 32 and the air/fuel ratio of the exhaust gas as parameters. The ammonia formation amount can be thereby adjusted appropriately.

Furthermore, depending on conditions, at the ammonia formation control, it is also possible to carry out the intra-exhaust pipe fuel injection, to perform either of catalyst temperature rise and ammonia formation, or both of them. The torque variation generated from the diesel engine 10 can be thereby avoided.

Consequently, the method of controlling NOx purification system and the NOx purification system 1 having the above-described constitution can prevent the outflow of NOx downstream the selective reduction catalyst, at not carrying out the ammonia formation control, caused by the shortage of ammonia adsorbed by the selective reduction catalyst for reducing NOx flowing downstream the first catalyst. Further, in addition, it is possible to avoid excess supply of ammonia to the selective reduction catalyst 33 at the ammonia formation, and to prevent outflow of ammonia downstream the selective reduction catalyst 33.

Meanwhile, in the NOx purification system of the above-described embodiment, the lean NOx catalyst (LNT) 32 is used as the first catalyst, but, a ternary catalyst may be used in place of the lean NOx catalyst. When the ternary catalyst is used, the NOx contained in the exhaust gas, not the NOx that is stored by and then released from the NOx occlusion reduction type catalyst, is converted to ammonia.

Further, the NOx occlusion reduction type catalyst is used as the lean NOx catalyst 32, but, a direct reduction type NOx catalyst may be used in place of the NOx occlusion reduction type catalyst. When the direct reduction type NOx catalyst is used, too, the NOx contained in the exhaust gas, not the NOx that is stored by and then released from the NOx occlusion reduction type catalyst, is converted to ammonia.

The method of controlling NOx purification system and the NOx purification system of the present invention that exert aforementioned excellent effects are disposed to an internal combustion engine mounted to a vehicle, and the like, and can be extremely effectively utilized for a NOx gas purification system provided with a selective reduction catalyst.

What is claimed is:

1. A method of controlling an NOx purification system including, in order from an upstream side of an exhaust gas passage of the system, a first catalyst which is a lean NOx catalyst or a ternary catalyst, and a selective reduction type catalyst, comprising:
   performing ammonia formation control as follows
   when a temperature of the first catalyst is less than a prescribed temperature at which ammonia is formed by the first catalyst, performing temperature rise control of the first catalyst;
   during the first catalyst temperature rise control, calculating an ammonia adsorption amount of the selective type catalyst based on NOx flowing into the selective reduction type catalyst;
   computing an ammonia adsorption target amount of said selective reduction type catalyst based on the calculated ammonia adsorption amount; and
   performing said ammonia formation control out only when a cumulative value of an ammonia formation amount formed by said first catalyst is under said ammonia adsorption target amount.

2. The method of controlling an NOx purification system according to claim 1, further comprising:
   computing, when said ammonia formation control is not being carried out, an amount of ammonia adsorbed by said selective reduction type catalyst; and
   starting said ammonia formation control, when the ammonia adsorption amount becomes not more than a prescribed ammonia formation starting amount.

3. The method of controlling an NOx purification system according to claim 1 or 2, further comprising:
   computing said ammonia adsorption target amount from an ammonia adsorption upper limit amount capable of being adsorbed by said selective reduction type catalyst, and from an ammonia adsorption amount adsorbed by said selective reduction type catalyst at a start of said ammonia formation control.

4. The method of controlling an NOx purification system according to claim 3, further comprising:
   using, during computing said ammonia adsorption target amount, at least one of map data of an NOx amount flowing out from said first catalyst, and map data of the ammonia adsorption upper limit amount capable of being adsorbed by said selective reduction type catalyst.

5. The method of controlling an NOx purification system according to claim 1 or 2, further comprising:
   performing, during said ammonia formation control, an exhaust gas air/fuel ratio control to make an air/fuel ratio of the exhaust gas into a rich state, only when the temperature of said first catalyst is not less than the prescribed temperature, and the temperature of said first catalyst becomes not less than said prescribed temperature by the first catalyst temperature rise control.

6. The method of controlling an NOx purification system according to claim 1 or 2, further comprising:
   controlling, during said ammonia formation control, an air/fuel ratio of the exhaust gas according to map data of an ammonia formation amount having the temperature of said first catalyst and the air/fuel ratio of the exhaust gas as parameters.

7. The method of controlling an NOx purification system according to claim 1 or 2, further comprising:
   performing, during said ammonia formation control, an intra-exhaust pipe fuel injection to allow either the first catalyst temperature rise or the ammonia formation, or both of them.

8. A NOx purification system, comprising:
in order from an upstream side of an exhaust gas passage of the system,
a first catalyst which is a lean NOx catalyst or a ternary catalyst;
a selective reduction type catalyst; and
a NOx purification control device that performs ammonia formation control as follows
when a temperature of the first catalyst is less than a prescribed temperature at which ammonia is formed by the first catalyst, a temperature rise control of the first catalyst is performed,
during the first catalyst temperature rise control, the control device calculates an ammonia adsorption amount of the selective reduction type catalyst based on NOx flowing into the selective reduction type catalyst, and
computes an ammonia adsorption target amount of said selective reduction type catalyst based on the calculated ammonia adsorption amount,
wherein said ammonia formation control is performed only when a cumulative value of an ammonia formation amount formed by said first catalyst is under said ammonia adsorption target amount.

9. The NOx purification system according to claim 8, further comprising:
an ammonia formation start determination device that computes an amount of ammonia adsorbed by said selective reduction type catalyst, when said ammonia formation control is not carried out by said NOx purification control device, and that starts said ammonia formation control, only when the ammonia adsorption amount becomes not more than a prescribed ammonia formation starting amount.

10. The NOx purification system according to claim 8 or 9, wherein said NOx purification control device computes said ammonia adsorption target amount from an ammonia adsorption upper limit amount capable of being adsorbed by said selective reduction type catalyst, and the ammonia adsorption amount adsorbed by said selective reduction type catalyst at a start of said ammonia formation control.

11. The NOx purification system according to claim 10, wherein said NOx purification control device uses at least one of map data of an NOx amount flowing out from said first catalyst, and map data of the ammonia adsorption upper limit amount capable of being adsorbed by said selective reduction type catalyst, during computing said ammonia adsorption target amount.

12. The NOx purification system according to claim 8 or 9, wherein, during said ammonia formation control, said NOx purification control device performs an exhaust gas air/fuel ratio control to make an air/fuel ratio of the exhaust into a rich state, only when a temperature of said first catalyst is not less than a prescribed temperature, and when the temperature of said first catalyst becomes not less than said prescribed temperature by the catalyst temperature rise control.

13. The NOx purification system according to claim 8 or 9, wherein said NOx purification control device controls an air/fuel ratio of the exhaust gas according to map data of an ammonia formation amount having the temperature of said first catalyst and the air/fuel ratio of the exhaust gas as parameters during said ammonia formation control.

14. The NOx purification system according to claim 8 or 9, wherein, during said ammonia formation control, said NOx purification control device carries out an intra-exhaust pipe fuel injection, and performs either the first catalyst temperature rise or the ammonia formation, or both of them.

* * * * *